United States Patent [19]
Tyner

[11] Patent Number: 5,486,391
[45] Date of Patent: Jan. 23, 1996

[54] PORTABLE FABRIC COVERED DIVIDER PANELS

[76] Inventor: Jeffrey D. Tyner, 2879 Canyonside Ct. NE., Grand Rapids, Mich. 49505

[21] Appl. No.: 270,730

[22] Filed: Jul. 5, 1994

[51] Int. Cl.⁶ .............................. B32B 3/06; B32B 27/10; B32B 27/32; B32B 27/40
[52] U.S. Cl. .................. 428/44; 52/71; 52/239; 52/309.9; 52/586.2; 160/135; 160/231.1; 160/231.2; 160/351; 428/45; 428/52; 428/53; 428/54; 428/71; 428/83; 428/122; 428/319.3; 428/319.7; 428/319.9; 428/424.2; 428/424.8
[58] Field of Search ................. 428/44, 45, 52, 428/53, 54, 71, 83, 122, 424.2, 424.8, 319.3, 319.7, 319.9; 160/135, 231.1, 231.2, 351; 52/239, 309.9, 71, 811, 821, 823

[56] References Cited

U.S. PATENT DOCUMENTS

| | | | |
|---|---|---|---|
| 2,896,271 | 7/1959 | Kloote et al. | 20/4 |
| 3,213,071 | 10/1965 | Campbell | 260/88.2 |
| 3,230,681 | 1/1966 | Allen et al. | 52/309 |
| 3,281,510 | 10/1966 | Lovret | 264/47 |
| 3,304,219 | 2/1967 | Nickerson | 161/162 |
| 3,327,441 | 6/1967 | Kelly | 52/309 |
| 3,363,378 | 1/1968 | Palfey | 52/309 |
| 3,389,195 | 6/1968 | Gianakos et al. | 264/45 |
| 3,410,931 | 11/1968 | Johnson | 264/45 |
| 3,468,771 | 9/1969 | Pedlow | 52/309 |
| 3,563,845 | 2/1971 | Stevens | 161/160 |
| 3,662,807 | 5/1972 | Miller | 160/135 |
| 3,970,502 | 7/1976 | Turner | 156/310 |
| 4,641,468 | 2/1987 | Slater | 52/309.4 |
| 4,776,903 | 10/1988 | Nordskog | 156/64 |
| 5,086,599 | 2/1992 | Meyerson | 52/309.9 |
| 5,098,059 | 3/1992 | Sawyer | 249/16 |
| 5,102,710 | 4/1992 | Kaufman et al. | 428/71 |
| 5,287,909 | 2/1994 | King et al. | 160/135 |

*Primary Examiner*—D. S. Nakarani
*Attorney, Agent, or Firm*—Ian C. McLeod

[57] ABSTRACT

A panel (10) for use as a space divider (100) or to be attached to furniture (102) is described. The panel has a molded polystyrene beads (STYROFOAM™) bead board core (12) encased in a plastic film layer (14) which stabilizes the panel and allows the panel to be used as a tack board. A decorative outer cover (18) is provided over the core and plastic layer to increase the aesthetic quality and versatility of the panel. Support plates (26) are provided along the edges (12C) of the core underneath the plastic layer to increase the structural strength of the panel and to enable attachment of the panels to each other or to other furniture. Attachment rails (20) are provided on the outside of the panel to protect the edges of the panel and enable a connector hinge (22) to be attached to the panel for connecting two panels together. The panels being used as a space divider can also have adjustment units (24) to change the height of the space dividers and to stabilize the divider especially on an uneven ground surface.

41 Claims, 4 Drawing Sheets

PORTABLE FABRIC COVERED DIVIDER PANELS

BACKGROUND OF THE INVENTION

(1) Field of the Invention

The present invention relates to a panel having a polystyrene bead board (STYROFOAM™) core encased in a plastic film layer in a manner which very significantly strengthens the panel. In particular, the present invention relates to a panel wherein the polystyrene bead board (STYROFOAM™) bead board core is able to be constructed in any configuration to enable the panel to be attached to free standing furniture or to be used separately or with other panels to form office dividers.

(2) Prior Art

The prior art has described several uses for panels having a foam core encased in an outer material. Illustrative of the prior art using foam panels are U.S. Pat. No. 5,098,059 to Sawyer; U.S. Pat. No. 2,896,271 to Kloote et al; U.S. Pat. No. 5,086,599 to Meyerson and U.S. Pat. No. 3,230,681 to Allen et al.

Sawyer describes a concrete forming device wherein foam pieces surrounded by a non-permeable, laminated plastic film are adapted for use in the concrete casting and a method for forming the panels. The foam panels are used as liners for the concrete forms.

Kloote et al describes the construction of an enclosure for a refrigerated area using laminated panels. The panels have a polystyrene core with polyester resin facing sheets. The panels are manufactured to have a low coefficient of thermal transmission as well as being impervious to moisture.

Meyerson describes a joint for connecting adjacent structural panels for building. The panels have a polystyrene bead board (STYROFOAM™) core with an outer skin laminated to the core. Preferably, the skin is made up of aluminum. The panels may be used for roofing or sidewalls, interior or exterior.

Allen et al describes a means using a splice member to connect foam laminated panels in edge to edge relationship to reduce thermal leakage.

The prior art also shows various building panels having a foam core with an outer layer. Illustrative are U.S. Pat. No. 3,327,441 to Kelly; U.S. Pat. No. 3,363,378 to Palfey; U.S. Pat. No. 3,563,845 to Stevens; U.S. Pat. No. 3,970,502 to Turner; U.S. Pat. No. 5,102,710 to Kaufman et al; U.S. Pat. No. 4,641,468 to Slater; and U.S. Pat. No. 4,776,903 to Nordskog.

Kelly describes an insulated structural member comprised of a beam of rigid plastic foam reinforced by metal bars bound therewith by a combination of a wrapping material of low thermal conductivity and a thermosetting binder substantially impregnated therein. The member is fixed within a main body of insulation and then a skin is provided to cover the entire assembly. The beams may be made of any stiff, plastic foam such as polyurethane, polystyrene, phenolic and the like or other suitably stiff insulating material such as preformed resin bonded fibrous glass insulation and the like. The bars may be of any metal such as steel, aluminum and the like. The wrapping material may be any material of low thermal conductivity woven, non-woven or unwoven including webbed and continuous material and filamenting wound fibrous material, such as woven glass fibers or cloth, jute, linen, thermoplastic fibers or sheets or the like. The outer skin of the entire assembly is made of fiberglass reinforced epoxy resin laminate or other materials such as resin reinforced polystyrene or other plastic laminate, metal, plywood and the like may be used.

Palfey describes sandwiched panels used for the construction of enclosures. The panels are comprised of a core divided into sections with stiffeners positioned between each section and face sheets on either side of the core. The core is made from a synthetic resinous foam such as foamed polystyrene, foamed polyurethane, foamed phenolic resinous compositions and the like. The face sheets are made of such materials as hardboard, fiberboard, plywood, metal sheets and the like.

Stevens describes a three-layered plastic thermally insulating panel-like composite. The first layer is composed of a cellular polyurethane material. The second layer is composed of an organic rigid polymeric solid. The third layer is composed of an organic, rigid polymeric solid. The solid is comprised of an interpolymer system of monovinyl aromatic compound and alpha-electronegatively substituted ethane compound.

Turner describes a building panel having a foam core with an outer skin bonded to the opposite sides thereof. Edge members extend along the entire length of the panel and are adhesively bonded to the foam core and to the outer skins to provide rigidity to the panel. The skins are laminated onto the foam core by a solvent based adhesive. The solvent is blocked from contact with the foam by a water based adhesive composition which is compatible with the foam core. The core is made of polystyrene and the outer skins are made of steel.

Kaufman et al describes a composite laminated decorative panel for use in building wall systems. The panel is a three component sandwich panel comprised of a thermoplastic shell which is laminated with a weatherable coating, a rigid foam center and a fire blocking backerboard. The thermoplastic shell is made of ABS (a mixture of styrene acrylonitrile copolymer (SAN) with SAN-grafted polybutadiene rubber) although, other materials such as PC-PVC or polystyrene can be used. The weatherable coating is made of a high gloss, high impact sheet extrusion resin or a acrylic film or a polyvinyldiene fluoride (PVDF). The foam center is polyurethane rigid foam. The backerboard is preferably a non-combustible fiber reinforced cement panel.

Slater describes a panel structure for use in building systems for the construction of buildings. The panel is comprised of a plurality of elongated slabs of rigid structural grade polystyrene foam insulation material. The slabs are held together and bonded to rigid framing members made of steel. The opposing surfaces of the panel are covered with a variety of skins, such as plywood, sheet rock or cementitious stucco-like material or glass reinforced acrylic resin coating.

Also of interest are U.S. Pat. No. 3,213,071 to Campbell; U.S. Pat. No. 3,281,510 to Lovret; U.S. Pat. No. 3,304,219 to Nickerson; U.S. Pat. No. 3,389,195 to Gianakos et al; U.S. Pat. No. 3,410,931 to Johnson and U.S. Par. No. 3,468,771 to Pedlow which describe different types of laminated foam board and different methods of manufacturing laminated foam board.

The prior art does not show a panel for use with office furniture or as a room divider which has a polystyrene bead board (STYROFOAM™) core covered by a plastic film layer which strengthens the core to allow use of the core without the need for additional structural support. There remains a need for such a panel which is lightweight for easy assembly and yet durable to withstand punctures without damage to the core of the panel.

OBJECTS

It is therefore an object of the present invention to provide a panel which can be mounted to furniture or which can be used alone to form a divider. Further, it is an object of the present invention to provide a panel which is easy to install and remove. Still further, it is an object of the present invention to provide a panel cover which is lightweight, durable and inexpensive to manufacture.

DETAILED DESCRIPTION OF THE PREFERRED EMBODIMENTS

The present invention relates to a panel for use as a space divider which comprises: a polystyrene bead board (STYROFOAM™) bead board core configured in a shape defining the panel of the space divider; a flexible plastic film layer adhered to the core to provide an outside surface of the panel and covering the core to thereby provide structural strength for the core, wherein the panel is able to withstand repeated punctures in a single hole without compromising the strength and integrity of the panel adjacent the hole; holding means mounted adjacent the core for holding the panel in an upright position such that the panel provides a divider for a space; and a decorative outer layer covering at least a first portion of the core and the plastic film layer.

Furthermore, the present invention relates to a panel for use as a space divider which comprises: a polystyrene bead board (STYROFOAM™) bead board core configured in a shape defining the panel of the space divider; a flexible plastic film layer adhered to the core in tension to provide an outside surface of the panel and completely encasing the core to thereby provide structural strength for the core, wherein the panel is able to withstand multiple punctures without compromising the strength and integrity of the panel; holding means mounted adjacent the core for holding the panel in an upright position such that the panel provides a divider for a space; a support means mounted on the core for securing the holding means to the panel; and a decorative outer layer covering at least a first portion of the core and the plastic film layer.

The plastic layer is preferably comprised of two sheets of a polyethylene film layer laminated to the core which cover the top side and the bottom side of the core. Alternately, the plastic layer can be constructed of a rigid, nonporous polystyrene film layer. In addition, the plastic layer can be vacuum formed onto the core. An adhesive is provided between the core and the plastic film layer to further secure or laminate the plastic layer to the core. The panel is preferably provided with attachment rails which add strength to the panel and allow attachment of the panel to other panels or to office furniture. The core of the panels can be constructed in any configuration which allows the panels to be used in a variety of areas including attachment to office furniture and as office dividers.

Figure 1:
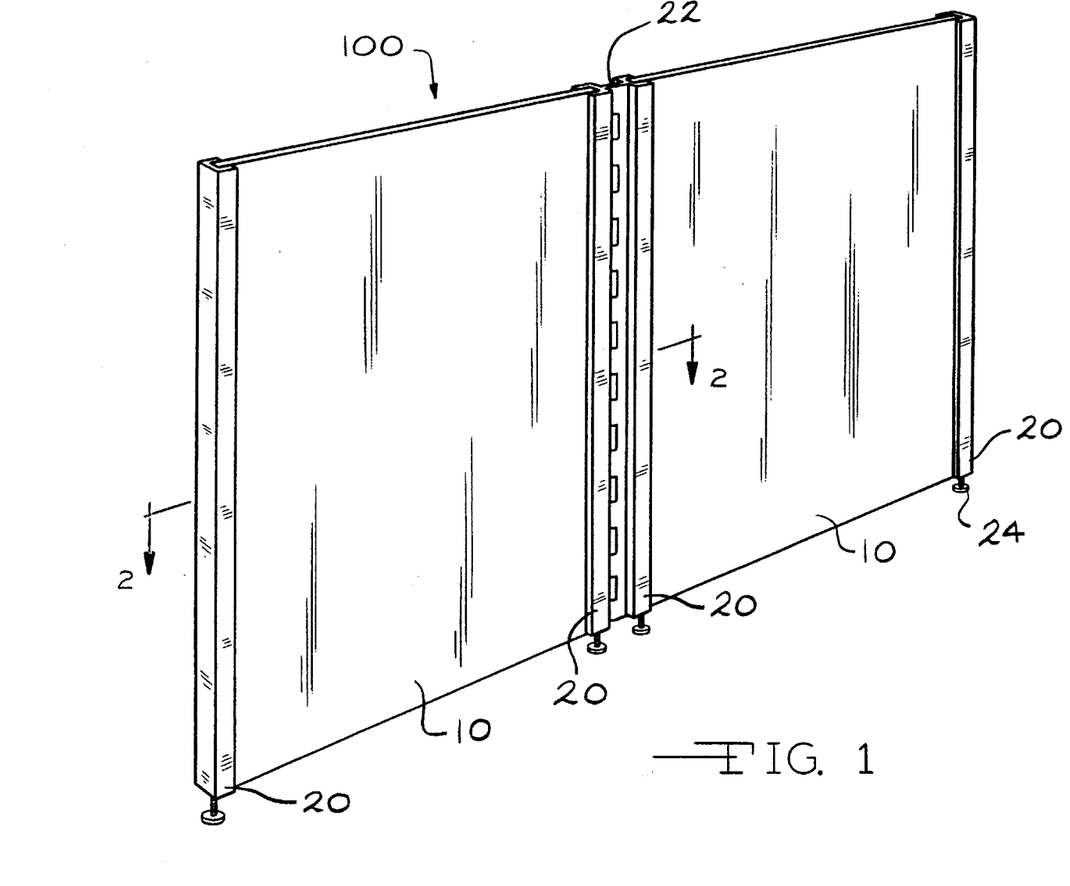
FIG. 1 is a perspective view showing two panels 10 mounted together by a connector hinge 22 and forming a space divider 100 having adjustment units 24.
Figure 2:
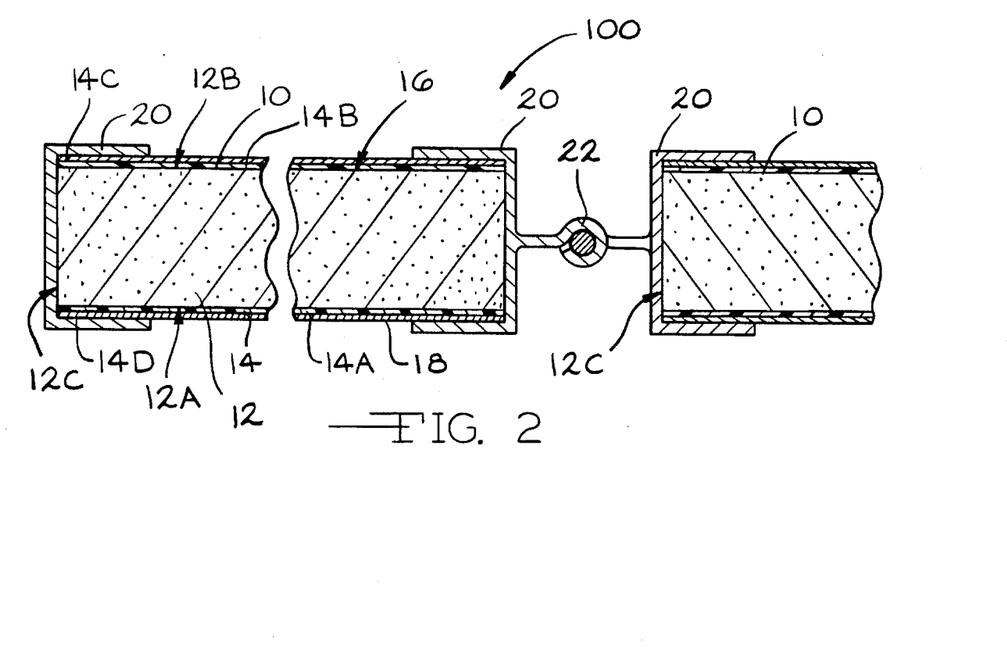
FIG. 2 is a cross-sectional view of the space divider 100 of FIG. 1 along the line 2—2 showing the core 12, the plastic film layer 14, the decorative outer cover 18, the C-shaped attachment rail 20 of both panels 10 and the connector hinge 22.
Figure 3:
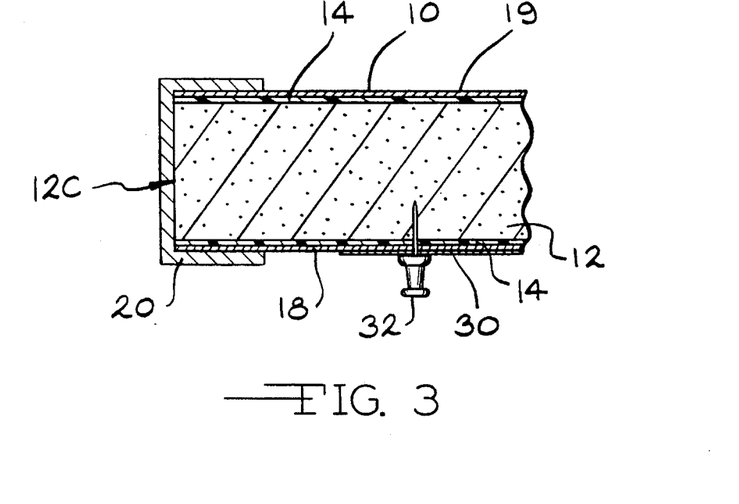
FIG. 3 is a cross-sectional view of a panel 10 showing a pin 32 extending through the decorative outer cover 18 and the plastic film layer 14 and into the core 12 and securing an object 30 to the panel 10.
Figure 5:
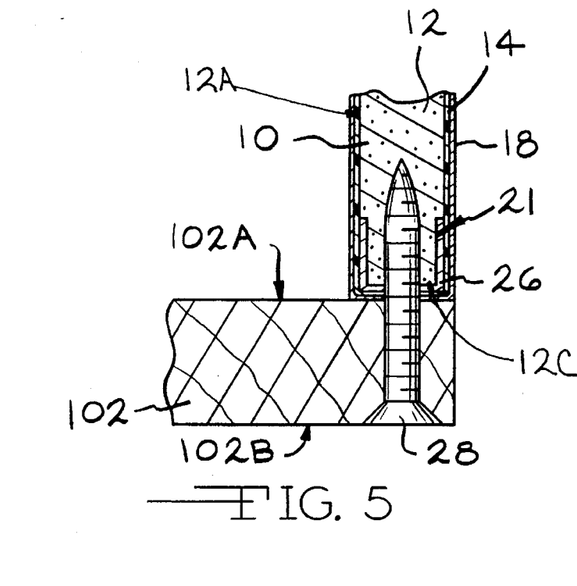
FIG. 5 is a cross-sectional view of one panel 10 and the desk 102 of FIG. 4 along the line 5—5 showing the mounting screw 28 extending through the desk 102 and into the support plate 26 of the panel 10.

FIG. 1 shows the panel 10 of the present invention attached to another panel 10 by a connector hinge 22 to form a space divider 100. FIGS. 2 and 3 show the specific construction of the panel 10 comprising a polystyrene bead board (STYROFOAM™) bead board core 12 covered in a rigid plastic film layer 14, both of which are at least partially covered by a decorative outer layer 18. The polystyrene bead board (STYROFOAM™) bead board core 12 is similar to that commonly used commercially. The bead board core 12 has a top side 12A and a bottom side 12B with edges 12C around the perimeter. The density of the core 12 is such as to allow the core 12 to be lightweight while still providing the necessary structural strength. In the preferred embodiment, a 2 to 3 lb/cubic foot board is used for the core 12 in order to achieve the desired density. The thickness of the core 12 may vary depending on the overall size of the panel 10 and the specific use for the panel 10. In general, the thickness of the core 12 is between about ½ and 4 inches. A C-shaped attachment rail 20 (to be described hereinafter) may be mounted to the core 12 to provide additional strength to the panel 10 and to allow attachment of the panel 10 to other panels 10 (FIG. 2) and to other furniture such as a desk 102 (FIG. 5). The core 12 is able to be constructed in any configuration depending upon the particular use for the panel 10. The ability to construct the core 12 in any configuration significantly increases the versatility of the panels 10.

The rigid plastic film layer 14 is uniformly adhered to the core 12 and completely encases the core 12. The plastic film 14 preferably covers the top side 12A and the bottom side 12B and leaves the edges 12C of the core 12 uncovered (FIGS. 2 and 3). By covering the core 12 in a plastic layer 14 the strength of the core 12 is increased and the structural integrity of the core 12 is protected. The plastic layer 14 preferably has a uniform thickness of approximately between 0.010 and 0.020 inches around the core 12. The plastic film layer 14 is considered to be "rigid" although, the thinness of the plastic layer 14 allows the plastic layer 14 to flex prior to attachment. The plastic layer 14 however preferably is not able to be stretched or expanded without heating. The plastic layer 14 provides a protective skin around the core 12 which provides extra strength to the core 12 and enables the panel 10 to be used as a tack board for objects 30 (FIG. 3). The plastic layer 14 allows the panel 10 to be used as a tack board to mount objects 30 which are heavier than those normally mounted on a tack board by a pin 32. The plastic layer 14 encloses around and cams against the pin 32, mounted in the opening (not shown) in the core 12. Once the pin 32 is inserted into the plastic film layer 14 and the core 12, the plastic film layer 14 secures the pin 32 in the opening and prevents the pin 32 from falling out of the panel 10 (FIG. 3). The plastic layer 14 enclosed around the inserted pin 32 also enables the pin 32 to support heavier objects 30. The plastic layer 14 continues to enclose around the pin 32 in the opening even after the pin 32 has been inserted and withdrawn from the opening multiple times. Thus, the plastic film layer 14 allows the same opening in the core 12 to be used repeatedly. This increases the useful life of the panel 10. The plastic layer 14 also protects the structural integrity of the core 12 and holds the core 12 together even after multiple punctures have been made in the plastic layer 14 and core 12 of the panel 10 in the same opening or in multiple adjacent openings (not shown). Further, the plastic layer 14 increases the durability of the core 12 by reducing the possibility of accidental surface damage to the core 12 such as chipping.

In the preferred embodiment, the plastic film layer 14 is comprised of a first sheet 14A and a second sheet 14B. As shown in FIGS. 2 and 3, the first sheet 14A covers the top side 12A of the core 12 and extends to the edges 12C of the core 12. The second sheet 14B covers the bottom side 12B of the core 12 to the edges 12C. Preferably, the first sheet 14A is of a size such as to completely cover the top side 12A of the core 12 but not such that the ends 14C of the first sheet 14A extend over the edges 12C of the core 12. Likewise, the ends 14D of the second sheet 14B preferably do not extend over the edges 12C of the core 12 such as to cover the edges 12C of the core 12. The first and second sheets 14A and 14B are preferably laminated onto the core 12. Cold forming of the sheets 14A and 14B onto the core 12 is less expensive than other methods such as vacuum forming which requires heating of the plastic layer 14. Laminating the sheets 14A and 14B onto the core 12 also allows recycled plastic layers to be used which also reduces the cost.

In two alternate embodiments (FIG. 5), first and second extended sheets extend beyond the edge 12C of the core 12 such that ends of the sheets overlap at the edges 12C of the core 12. The first extended sheet is of a size as to completely encase the top side 12A of the core 12 and to extend over a majority of the surface of the edges 12C but not such that the ends of the first extended sheet extend beyond the edges 12C of the core 12. Likewise, the ends of the second extended sheet preferably do not extend beyond the edges 12C of the core 12 such as to overlap the first extended sheet on the top side 12A of the core 12. Thus, preferably only the ends of the extended sheets overlap at the edges 12C of the core 12. In the first alternate embodiment, the ends of the extended sheets are vacuum formed around the edges 12C of the core 12. In the second alternate embodiment, the extended sheets are vacuum formed completely around the entire core 12. In both alternate embodiments, the extended sheets are vacuum formed over the support plates 26, if provided (to be described in detail hereinafter). Vacuum forming the extended sheets over the support plates 26 adds strength to the panel 10 at the support plates 26 and securely mounts the support plates 26 onto the core 12. In addition, vacuum forming the film layer 14 over the support plates 26 eliminates the need to use additional means to secure the support plates 26 onto the core 12. However, additional attachment means may be used, in which case the vacuum formed plastic layer mainly provides additional strength at the edges 12C and increases the overall strength of the panel 10.

The plastic film layer 14 is preferably made of a recycled polyethylene such as PETG sold by P. C. Plastics, Itasca, Ill., or alternately, a high impact, regrind polystyrene such as that manufactured by Primex Plastics, Richmond, Ind. The polyethylene is used particularly when the plastic film layer 14 is vacuum formed onto the core 12. In addition, the polyethylene is less susceptible to the effects of ultra violet radiation and is useful where the panel 10 comes in contact with sunlight. One of the advantages of using polystyrene is that regrind polystyrene is less expensive than polyethylene and the lower quality of the regrind polystyrene is satisfactory for most uses of the panels 10. In addition, the regrind polystyrene is more rigid than the polyethylene. The type of material used to construct the plastic film layer 14 can be varied depending on the specific use of the panels 10 and the particular building codes in the area where the panels 10 are to be used. For example, low smoke or fire resistant plastics may be needed for panels 10 used in areas which require fire ratings.

An adhesive 16 is used between the core 12 and the plastic layer 14 in order to adhere the plastic layer 14 to the core 12 in all the embodiments. In the preferred embodiment, the adhesive 16 is sprayed onto both of the plastic layer 14 and the core 12 before the plastic layer 14 is positioned onto the core 12. In the alternate embodiments, the adhesive 16 is placed only onto the plastic layer 14 before the plastic layer 14 is heated and vacuum formed onto the core 12. By placing the adhesive 16 on the plastic layer 14, the adhesive 16 will adhere the second extended sheet of the plastic layer 14 to the core 12 and in addition the second extended sheet will adhere to the first extended sheet where the second extended sheet overlaps the first extended sheet around the edges 12C of the core 12. The plastic layer 14 may also already include an adhesive 16 directly on the surface when manufactured, thus eliminating the need to apply the adhesive 16 to the plastic layer 14 prior to application. By using a plastic layer 14 having an adhesive surface, the process of manufacturing the panel 10 is simplified. In the preferred embodiment where the plastic film layer 14 is laminated onto the core 12, the adhesive 16 is preferably a water based polyurethane adhesive which will not react with the foam core 12 such as FastBond™ 2000-NF adhesive manufactured by 3M, located in St. Paul, Minn. A rubber based adhesive could also be used. The type of adhesive 16 used depends in part on the specific qualities desired in the panel 10. By using a rubber based adhesive, the panel 10 tends to be more flexible while a water or solvent based adhesive is more rigid. Use of the water based adhesive however, is preferred due to the lack of fumes provided by the adhesive 16 during application and to the environmentally friendly nature of the adhesive 16.

In the alternate embodiments in which vacuum forming is used to adhere the plastic layer 14 to the core 12, a heat reactive water based polyurethane adhesive such as RK4000, manufactured by H. B. Fuller Company, St. Paul, Minn., is preferably used as the adhesive. A solvent based adhesive can also be used when vacuum forming as a majority of the solvent will be burnt off during heating of the plastic layer 14 prior to positioning of the plastic layer 14 on the core 12. Thus, the solvent based adhesive is almost a pure adhesive after heating which reduces the harmful effect of the solvent on the foam core 12. The water based or solvent based adhesives used in the alternate embodiments allow for a faster method of mounting the plastic layer 14 to the core 12 as the adhesive need only be applied to the plastic layer 14.

The decorative outer cover 18 is provided over at least a portion of the core 12 of the plastic layer 14. The outer cover 18 preferably covers at least one side of the core 12 and is approximately the same size and shape as one side 12A or 12B of the core 12 so as to fit closely around the core 12 (FIGS. 1 and 2). The decorative outer cover 18 is preferably mounted onto the core 12 using an adhesive (not shown) between the cover 18 and the plastic film layer 14. Preferably, the adhesive is applied only to the plastic layer 14 as the decorative outer cover 18 does not require extensive holding power to remain in place on the panel 10. The adhesive can be applied only at edges of the panel and pulled tight or another upholstery technique can be used. Alternately, the adhesive can be applied to both the outer cover 18 and the plastic layer 14. The decorative outer cover 18 provides added protection to the core 12 and extends the life of the core 12 by protecting the core 12 from direct exposure to the elements. Further, the outer cover 18 hides the puncture marks attributed to use of the panel 10 as a tack board and also makes dents and punctures in the panel 10 less visible. The cover 18 also increases the versatility of the panel 10 by enabling the decorative outer cover 18 to be changed for different uses without the need to change the internal core 12 and plastic film 14 structure of the panel 10. Preferably, the outer cover 18 is decorative such as to increase the aesthetic quality of the panel 10. In the preferred embodiment, the outer cover 18 is constructed of a fabric material. The outer cover 18 can also be constructed of a paper or a vinyl material. Although an outer cover 18 is preferred, the core 12 with the plastic layer 14 can be used as the complete panel 10 without the outer cover 18. To increase the aesthetic appearance of the panel 10, without the outer cover 18, colors and designs may be added directly to the core 12 or the plastic layer 14. A marker board surface 19 is optionally provided on the panel 10 on the side 12A or 12B of the core 12 which is preferably not covered by the decorative cover 18 (FIG. 3). The marker board 19 allows the panel 10 to be used as a board which is easily erasable and reusable. The marker board surface 19 is preferably similar to those used commercially. Furthermore, the marker board 19 can be mounted over the decorative outer cover 18 which allows for a variety of marker board 19 and tack board combinations over the sides 12A and 12B of the entire panel 10.

As shown in FIGS. 2, 3 and 5, a C-shaped attachment rail 20 is preferably mounted onto the core 12 to add structural support to the core 12 and also to provide an attachment surface for attaching the panel 10 to another panel 10 or to free standing furniture 102. The C-shaped attachment rail 20 is preferably mounted onto the panel 10 after the adhesion of the plastic layer 14 and the decorative outer cover 18 to the core 12. If a marker board 19 is present, the marker board 19 can extend to the edge 12C of the core 12 and be covered by the attachment rail 20 or the marker board 19 can be made smaller such as to not extend under the attachment rail 20. The edges 12C of the core 12 can be provided with a notch 21 for mounting of the C-shaped attachment rail 20 (FIG. 2). The notch 21 enables the C-shaped attachment rail 20 to be flush with the outside surface of the core 12 which increases the aesthetic appearance of the panels 10. Alternately, the C-shaped attachment rail 20 is mounted over the edge 12C of the core 12 and is visibly noticeable as it extends beyond the outer surface of the core 12. An adhesive (not shown) may be used to secure the C-shaped attachment rail 20 onto the panel 10. An attachment screw (not shown) may also be inserted through the C-shaped attachment rail 20 and into the core 12 to further secure the C-shaped attachment rail 20 onto the core 12. The attachment rail 20 can be of any shape or size depending upon the particular need for the attachment rail 20 and the item to which the panel 10 is to be attached or the item which is to be attached to the panel 10. The attachment rails 10 can also be provided with notches (not shown) or hooks (not shown) which allow the attachment of components such as shelves (not shown) onto the panels 10. The attachment rail 20 is usually located around the perimeter of the panel 10 on the edge 12C of the core 12.

The attachment rail 20 is preferably constructed of aluminum which is lightweight but provides high strength. Alternately, the rails 20 may be constructed of steel or a lightweight plastic material which allows the panels 10 to maintain the light weight.

The panels 10 can also be provided with support plates 26 mounted on the edges 12C of the core 12 (FIG. 5). The support plates 26 provide additional structural support to the core 12 and provide underlying support for the attachment rails 20 or other objects (not shown) attached to the panel 10. The support plates 26 also provide an attachment surface for attaching the panel 10 onto free standing furniture 102 particularly when an attachment rail 20 is not used. The support plates 26 are preferably C-shaped and are mounted over the edges 12C of the core 12 prior to the adhesion of the plastic layer 14. Consequently, the plastic layer 14 assists in securing the plates to the core 12. The support plates 26 can also be mounted in the same notch 21 as provided for the attachment rails 20. Preferably, an attachment screw (not shown) is also inserted through the support plate 26 and into the core 12 to further secure the support plate 26 onto the core 12. In the alternate embodiments, where the plastic layer 14 overlaps the edges 12C of the core 12, the support plate 26 is mounted beneath the plastic layer 14 and the plastic layer 14 is vacuum formed over the support plate 26. Once encased in the plastic layer 14, the plastic layer 14 secures the support plate 26 in place tight against the core 12. Preferably in this embodiment, the attachment screw is inserted into the support plate 26 and the core 12 prior to adhesion of the plastic layer 14 onto the core 12. The head of the screw is preferably flush with the support plate 26 in order to avoid accidental puncturing of the plastic layer 14. The support plates 26 are preferably similar to the attachment rails 20 in construction material and shape and size.

The panels 10 which are to be used as space dividers 100 are preferably provided with the attachment rails 20 along the vertical edges 12C of the panel 10 (FIG. 1). The rails 20 are mounted onto the edges 12C of the core 12 on top of the decorative outer cover 18. The rails 20 are attached to the panel 10 by securing screws (not shown) which extend through the rail 20 and into the core 12. Preferably, the head of the securing screw is flush with the outside surface of the rail 20 when fully secured into the core 12. Alternately, the rails 20 may be attached to the panel 10 by adhesive (not shown). In the preferred embodiment, the rails 20 are C-shaped and extend beyond the outside surface of the panel 10. The rails 20 may also have rounded outer corners (not shown) in order to prevent harm to the user due to accidental contact with the edge of the panel 10. The rails 20 enable the panels 10 to be connected together by a connector hinge 22 (to be described in detail hereinafter) to form a space divider 100. The rails 20 also protect the corners and edges 12C of the panel 10 against every day wear such as nicks.

Figure 2A:
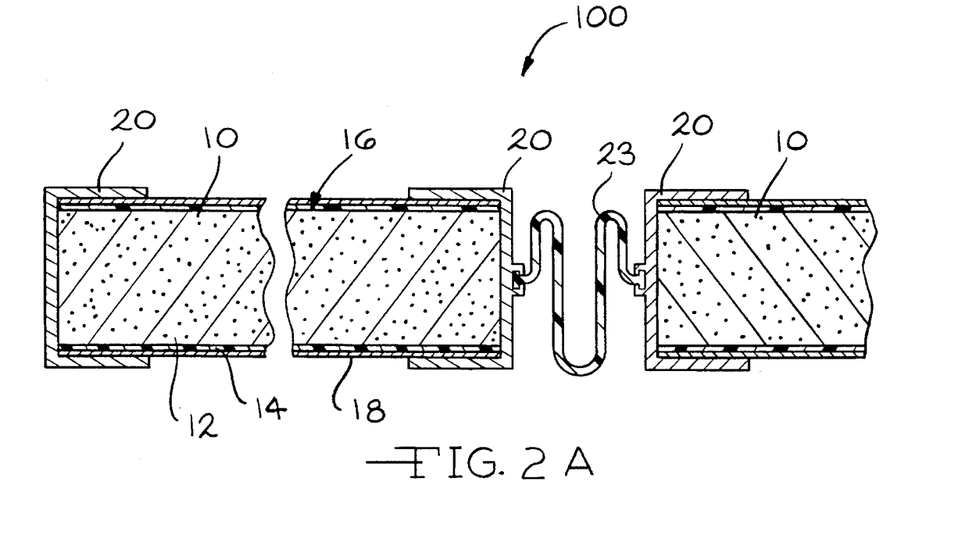
FIG. 2A is a cross-sectional view of the space divider 100 showing an alternate living hinge 23 between the C-shaped attachment rails 20 of the panels 10.

In the preferred embodiment, the panels 10 used as space dividers 100 are provided with a panel to panel connector hinge 22 which acts to connect two panels 10 together (FIGS. 1 and 2). The panel to panel connector hinge 22 is mounted onto the edge of the panel 10 to the attachment rails 20. As shown in FIG. 1, the connector hinge 22 is preferably a mechanical hinge mounted between the attachment rails 20 of two panels 10. Alternately as shown in FIG. 2A, the panels 10 are connected together by a living hinge 23 to create the space dividers 100. The living hinge 23 is constructed of thin plastic sections which extend between the attachment rails 20 of two adjacent panels 10. The plastic sections are preferably attached to each of the attachment rails 20 such as by Velcro® (not shown) or by sliding into a channel in the attachment rails 20 (FIG. 2A). The connector hinge 22 and living hinge 23 allow the panels 10 to be connected together to form space dividers 100. The space dividers 100 can be used to construct office units or modules (not shown). In addition, the sides of the panels 10 can be provided with the outer cover 18 or the marker board 19 which allows the room dividers 100 to be used as tack boards or marker boards depending on the particular panel 10 used for the divider 100.

The panels 10 of the space divider 100 are preferably provided with adjustment units 24 mounted on the edge of the panel 10 adjacent the ground surface (not shown) which hold the panels 10 in an upright, vertical position (FIG. 1). The adjustment units 24 enable the height of the panels 10 to be varied and also stabilize the panels 10 especially when used on uneven ground surfaces.

Figure 4:
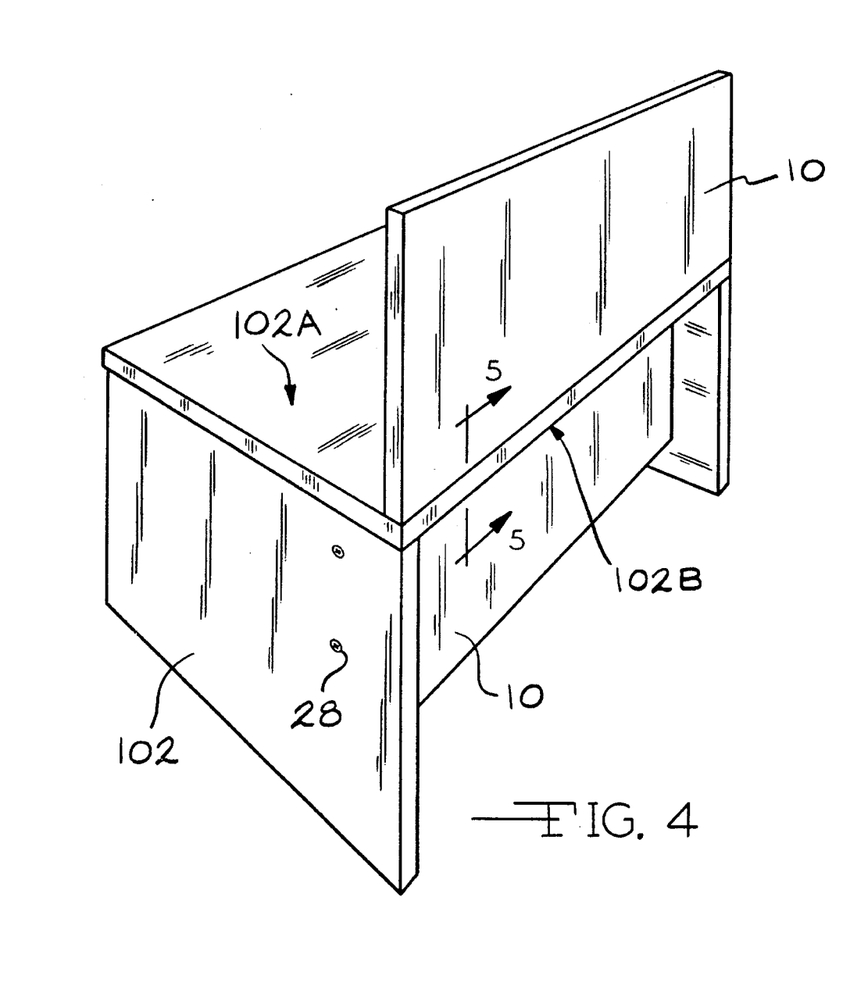
FIG. 4 is a perspective view of two panels 10 mounted onto a desk 102.

Alternately as shown in FIGS. 4 and 5, the panels 10 are connected onto free standing furniture such as a desk 102. The panels 10 are secured onto the desk 102 by mounting screws 28 (one shown) which extend through the desk 102 and into the panel 10. Preferably, the panel 10 is mounted onto the desk 102 such that the edge of the panel 10 having the support plate 26 and/or the attachment 20 adjacent the desk 102. Thus, the mounting screw 28 extends into the support plate 26 which enables the mounting screw 28 to be securely mounted within the core 12 of the panel 10. The panels 10 can be mounted by various different methods including other mechanical fasteners (not shown), adhesives (not shown) or Velcro® (not shown). As shown in FIG. 4, the panels 10 can be mounted on the top side 102A of the desk 102 or on the bottom side 102B of the desk 102 to form a privacy barrier.

To construct the panel 10, the bead board core 12 is first constructed to the desired configuration as determined by the particular intended use of the panel 10. The core 12 can either be formed into the required shape during molding of the core 12 or the core 12 can be cut to the required size and shape after molding. If a support plate 26 is to be used in the panel 10, the plate 26 is secured onto the core 12 at this time. Next, the first sheet 14A is laminated onto the top side 12A of the core 12. The adhesive is applied to both the first sheet 14A and the top side 12A of the core 12. If the ends 14C of the first sheet 14A extend beyond the edges 12C, the excess plastic layer 14 is cut off. The core 12 is then flipped over such that the bottom side 12B of the core 12 is facing upward. The above process is repeated for the second sheet 14B. The top and bottom sides 12A and 12B of the core 12 are now completely covered by the plastic layer 14 with the edges 12C of the core 12 uncovered.

In the alternate embodiment, the extended sheets extend over the edges 12C of the core 12 and are trimmed only if the ends extend beyond the edges 12C to the opposite side of the core 12. In the first alternate embodiment, the ends of the first sheet are first heated and vacuum formed around the edges 12C of the core 12. In the second alternate embodiment, the sheets are vacuum formed around the entire core 12 (FIG. 5). In the second alternate embodiment, the core 12 is placed onto a vacuum table (not shown) with the top side 12A of the core 12 facing upward. The first extended sheet of the plastic layer 14 is preferably previously located above the vacuum table and the core 12. The first extended sheet is then heated and lowered onto the top side 12A of the core 12. The plastic layer 14 is heated to a temperature of about 200° to 300° F. such that the plastic layer 14 expands and becomes very pliable such as to easily conform to the top side 12A of the core 12. The adhesive 16 is deposited onto the plastic layer 14 prior to the heating of the plastic layer 14. After the first extended sheet is placed onto the top side 12A of the core 12, the air is evacuated from the vacuum table such that the plastic layer 14 is vacuum formed around the top side 12A and the edges 12C of the core 12. Preferably, the most vacuum available from the vacuum being used is applied and held until the plastic layer 14 and the adhesive have cooled to about 150° F. The core 12 is then flipped over such that the bottom side 12B of the core 12 is facing upward. The above process is repeated for the second extended sheet. The core 12 is now completely encased in the plastic layer 14 with the first extended sheet and the second extended sheet overlapping on the edges 12C of the core 12. Thus, the plastic layer 14 is in tension and forms a stress skin around the entire core 12 which provides extra strength and extra protection to the core 12. The general method described in U.S. Pat. No. 5,098,059 to Sawyer can be used to construct this type of core 12 with the plastic layer 14.

Once the core 12 is encased in the plastic layer 14 and completely cooled, when necessary, the outer cover 18 is mounted on the core 12 with the plastic layer 14. Preferably, the adhesive is applied only to the plastic layer 14. The marker board 19 can be mounted onto the panel 10 at this time. The attachment rails 20, if needed, are then mounted onto the panel 10. The panel 10 is then either attached to another panel 10 using a connector hinge 22 or living hinge 23 to form a space divider 100 or is attached to other furniture 102 to form privacy screens for office units. The panels 10 are generally 4 to 6 ft in height and weigh an average of about 15 to 16 lbs. The weight of the panel 10, of course, varies with the size of the panel 10 and the accessories such as support plates 26 which are mounted onto the panel 10. Other panels 10 currently available for similar uses weigh on the average of 70 to 80 lbs for a 4 to 6 ft panel. The panels 10 of the present invention are easy to install and because of their light weight, are easily moved and rearranged which is essential in an office setting. The panels 10 can also be easily modified for different uses by changing or adding the decorative outer cover 18 or by adding or subtracting accessories such as rails 20 or adjustment units 24.

It is intended that the foregoing description be only illustrative of the present invention and that the present invention be limited only by the hereinafter appended claims.

I claim:

1. A panel for use as a space divider, which comprises:
   (a) a polystyrene bead board core configured in a shape defining the panel of the space divider;
   (b) a flexible plastic film layer adhered by an adhesive to the core to provide an outside surface of the panel and covering the core to thereby provide structural strength for the core, wherein the panel is able to withstand repeated punctures in a single hole by a fastening means without compromising the strength and integrity of the panel adjacent the hole and such that the plastic film layer retains the fastening means in the hole after each puncture;
   (c) holding means mounted adjacent the core for holding the panel in an upright position such that the panel provides a divider for a space; and
   (d) a decorative outer layer covering at least a first portion of the core and the plastic film layer.

2. The panel of claim 1 wherein a support means for the core is located at a perimeter on an edge of the core.

3. The panel of claim 2 wherein the core has a notch along the edge to accommodate the support means such that the support means is flush with the outside surface of the panel.

4. The panel of claim 2 wherein the support means is a C-shaped plate which is mounted over the edge of the core.

5. The panel of claim 2 wherein the support means is constructed of aluminum.

6. The panel of claim 2 wherein an attachment means is mounted through the support means and the core which secures the panel to the holding means.

7. The panel of claim 6 wherein the holding means is a desk and the panel is attached to the desk with the attachment means.

8. The panel of claim 7 wherein the attachment means is a screw.

9. The panel of claim 2 wherein a connector is mounted on the panel adjacent the support means to connect two or more panels at adjacent support means.

10. The panel of claim 9 wherein two or more panels are attached together by the connector to provide a continuous panel structure as the space divider.

11. The panel of claim 10 wherein the two or more panels have adjustment means on a bottom edge for adjusting the height of the panels with respect to a ground surface.

12. The panel of claim 1 wherein an erasable surface covers at least a second portion of the core and plastic film layer.

13. The panel of claim 12 wherein the first portion is a front side of the core and the second portion is a back side of the core.

14. The panel of claim 1 wherein the plastic film layer is a polyethylene film layer.

15. The panel of claim 1 wherein the adhesive means is a water based polyurethane.

16. The panel of claim 15 wherein the water based polyurethane is applied to the core and to the plastic film layer.

17. The panel of claim 1 wherein the flexible plastic film layer includes a first sheet and a second sheet and wherein the first sheet is adhered to a front side of the core and the second sheet is adhered to a back side of the core.

18. The panel of claim 17 wherein the first and second sheets are vacuum formed around the core so that the plastic film layer forms a stress skin which encases the entire core.

19. The panel of claim 1 wherein an object is attached to the panel by the fastening means which is mounted through the plastic film layer and creates an opening in the core and wherein the plastic film layer secures the fastening means in the opening in the core.

20. The panel of claim 19 wherein the plastic film layer closes in against the fastening means in the opening in the core and wherein the plastic film layer continues to close in against the fastening means after multiple withdrawals and insertions of the fastening means into the opening in the core.

21. The panel of claim 1 wherein the decorative outer layer is constructed of a fabric.

22. The panel of claim 1 wherein the decorative outer layer is constructed of vinyl.

23. The panel of claim 1 wherein the decorative outer layer is constructed of paper.

24. The panel of claim 1 wherein an adhesive is provided between the decorative outer cover and the plastic film layer for adhering the decorative outer cover to the plastic film layer and the core.

25. A panel for use as a space divider which comprises:
(a) a polystyrene bead board core configured in a shape defining the panel of the space divider;
(b) a flexible plastic film layer adhered by an adhesive to the core in tension to provide an outside surface of the panel and completely encasing the core to thereby provide structural strength for the core, wherein the panel is able to withstand multiple punctures in a single hole by a fastening means without compromising the strength and integrity of the panel and such that the plastic film layer retains the fastening means in the hole after each puncture;
(c) holding means mounted adjacent the core for holding the panel in an upright position such that the panel provides a divider for a space;
(d) support means mounted on the core for securing the holding means to the panel; and
(e) a decorative outer layer covering at least a first portion of the core and the plastic film layer.

26. The panel of claim 5 wherein the support means for the core is located at a perimeter on an edge of the core.

27. The panel of claim 26 wherein the core has a notch along the edge to accommodate the support means such that the support means is flush with the outside surface of the panel.

28. The panel of claim 27 wherein the support means is a C-shaped plate which is mounted over the edge of the core.

29. The panel of claim 25 wherein the support means is constructed of aluminum.

30. The panel of claim 26 wherein the holding means is an attachment means mounted through the support means and the core to provide an attachment means for the panel.

31. The panel of claim 30 wherein the panel is attached to a desk with the attachment means.

32. The panel of claim 30 wherein the attachment means is a screw.

33. The panel of claim 26 wherein the holding means is a connector means mounted on the flexible plastic film layer adjacent the support means to provide a connector means for adjacent panels.

34. The panel of claim 33 wherein the connector means of two or more panels are attached together to provide a continuous panel structure as the space divider.

35. The panel of claim 34 wherein the two or more panels have adjustment means on a bottom edge for adjusting the height of the panels with respect to a ground surface.

36. The panel of claim 25 wherein the plastic film layer is a polyethylene film layer.

37. The panel of claim 36 wherein the plastic film layer is vacuum formed around the core so that the plastic film layer forms a stress skin which encases the entire core.

38. The panel of claim 25 wherein the adhesive means is a water based polyurethane.

39. The panel of claim 25 wherein the decorative outer layer is constructed of a fabric.

40. The panel of claim 25 wherein an object is attached to the panel by the fastening means which is mounted through the plastic film layer and into the core and wherein the plastic film layer secures the fastening means in the opening in the core and secures the fastening means and the object to the panel.

41. The panel of claim 25 wherein the plastic film layer is a polystyrene film layer.

* * * * *

UNITED STATES PATENT AND TRADEMARK OFFICE
CERTIFICATE OF CORRECTION

PATENT NO. : 5,486,391
DATED : January 23, 1996
INVENTOR(S) : Jeffrey D. Tyner

It is certified that error appears in the above—identified patent and that said Letters Patent is hereby corrected as shown below:

Column 12, line 18 (Claim 26), "Claim 5" should read -- Claim 25--.

Signed and Sealed this

Eighteenth Day of June, 1996

Attest:

BRUCE LEHMAN

Attesting Officer      Commissioner of Patents and Trademarks